United States Patent [19]

Avitable

[11] Patent Number: 4,813,735
[45] Date of Patent: Mar. 21, 1989

[54] SECTIONALIZED ADJUSTABLE PICKUP TRUCK BOX COVER

[76] Inventor: Gerald Avitable, 218 Clark Chapel Rd., Nassau, N.Y. 12123

[21] Appl. No.: 80,876

[22] Filed: Aug. 3, 1987

[51] Int. Cl.⁴ .............................................. B60J 7/02
[52] U.S. Cl. ................................ 296/100; 296/180.1
[58] Field of Search .............. 296/220, 216, 101, 100, 296/57 R, 1 S; 52/796, 797

[56] References Cited

U.S. PATENT DOCUMENTS

| | | | |
|---|---|---|---|
| 3,342,523 | 9/1967 | Lutgen | 296/100 |
| 3,578,378 | 5/1971 | Anderson | 296/100 |
| 4,199,188 | 4/1980 | Albrecht et al. | 296/100 |
| 4,406,493 | 9/1983 | Albrecht et al. | 296/100 |
| 4,417,760 | 11/1983 | Koch | 296/1 S |
| 4,652,036 | 3/1987 | Okamoto et al. | 296/1 S |

*Primary Examiner*—Robert B. Reeves
*Assistant Examiner*—John M. Gruber
*Attorney, Agent, or Firm*—Schmeiser, Morelle & Watts

[57] ABSTRACT

A sectionalized pickup truck box cover composed of a plurality of transverse panels. A first transverse panel is placed on the most forward portion of a pickup truck box. A rear portion of the first panel top surface has a corrugated structure. The forward portion of a second transverse panel is placed over the corrugations to the extent desired by the user so as to assure a completed ensemble of the sectionalized panels that will adequately cover the pickup truck box. The transitional panels are added as needed to accomodate the length of the pickup truck box. Finally, a rear panel having a pivotal wind-spoiler lid or wind spoiler tailpiece is set over the rear end of the box so as to engage the rear portion of the last transition panel, the pickup tailgate is closed and the spoiler lid or spoiler tailpiece is lowered to secure the closed tailgate. As each section or panel is placed in position, over center draw-latches are used to secure it to the top portion of the pickup truck box by clamping panel internal flanges to the flange of the pickup box. In order to preserve the integrity of the box body, the inventor uses clamping mechanisms that will not require drilling into or otherwise perforating the pickup truck box. A drop-in tool basket is employed in certain versions of the cover.

13 Claims, 5 Drawing Sheets

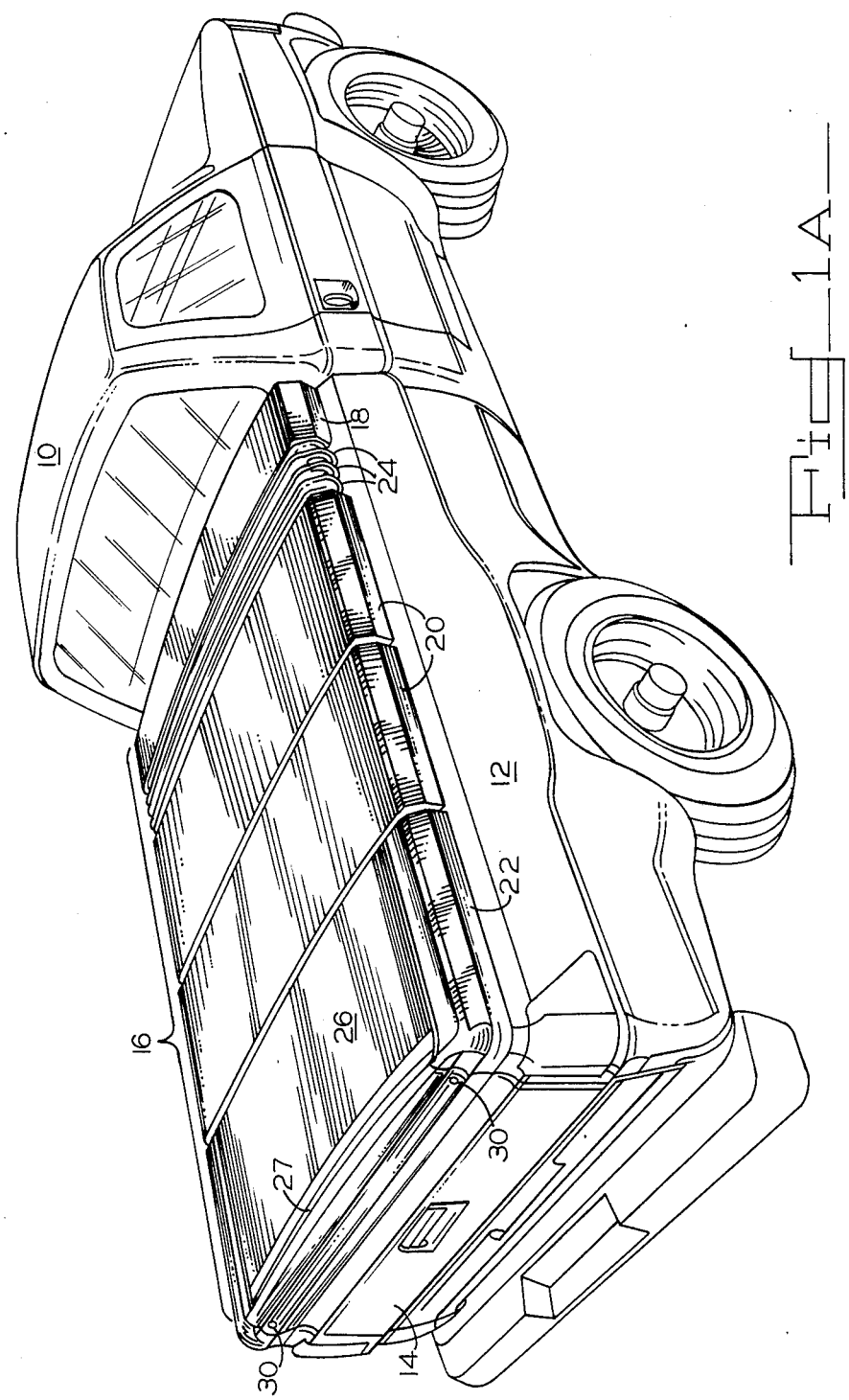
Fig_1A

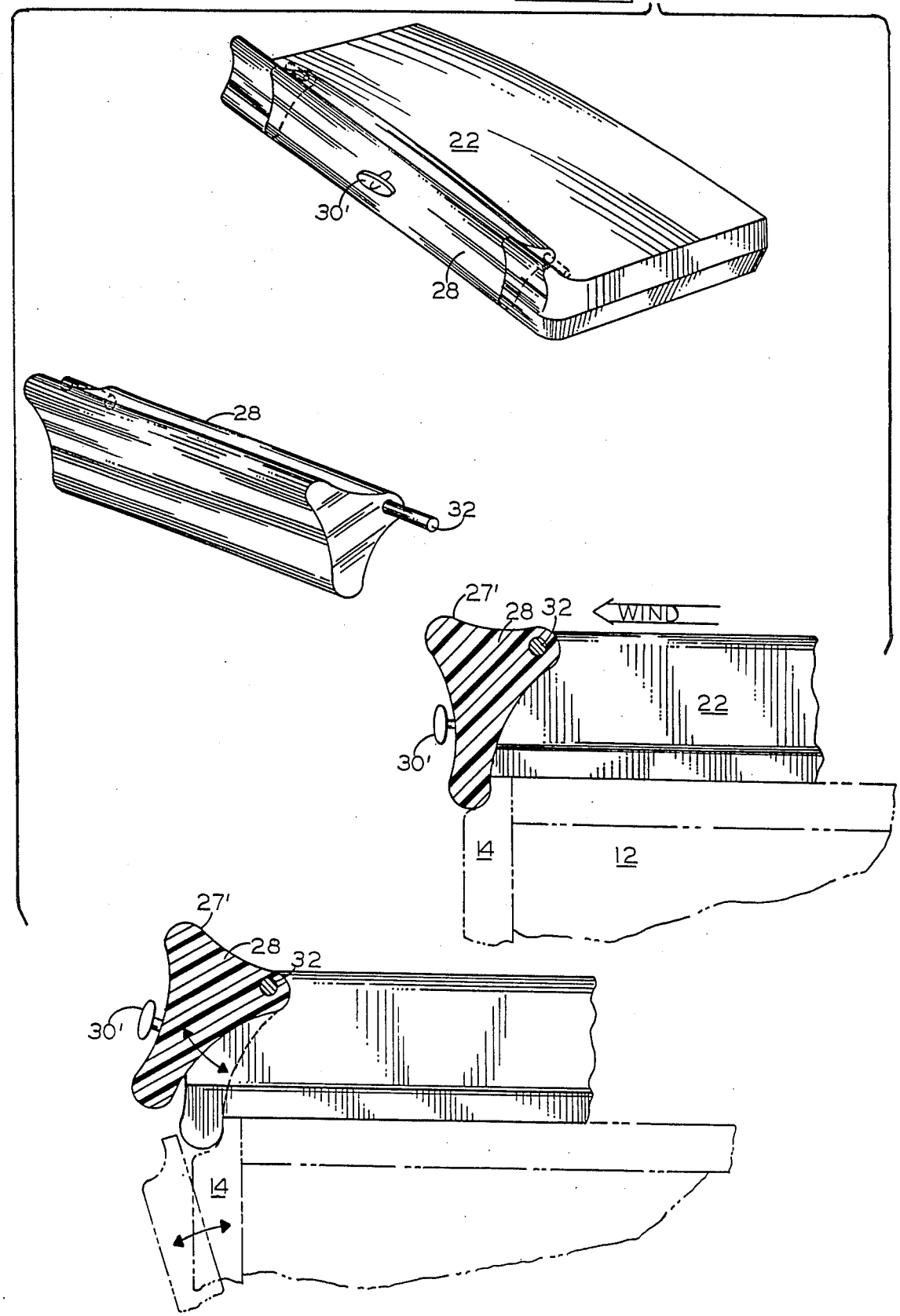

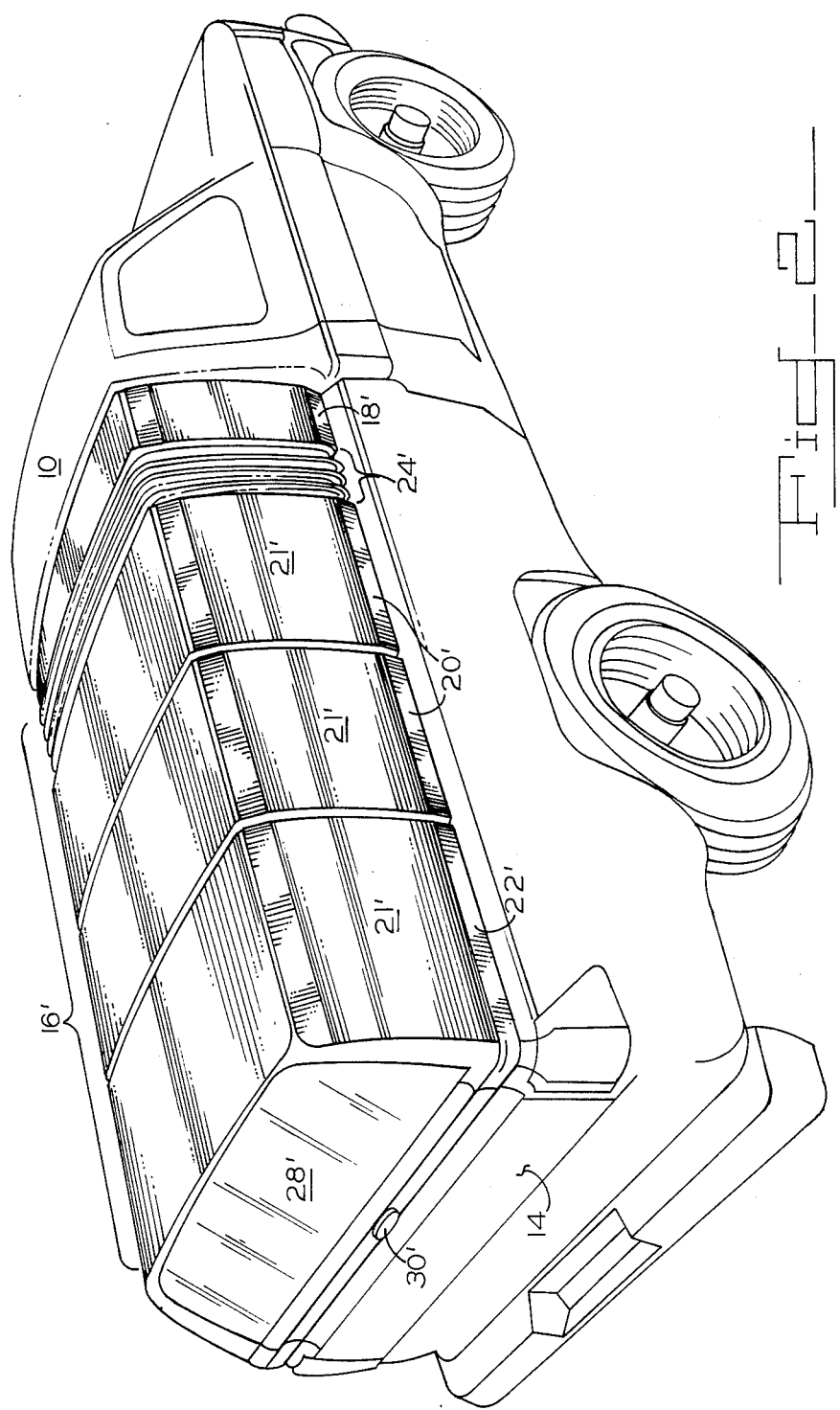

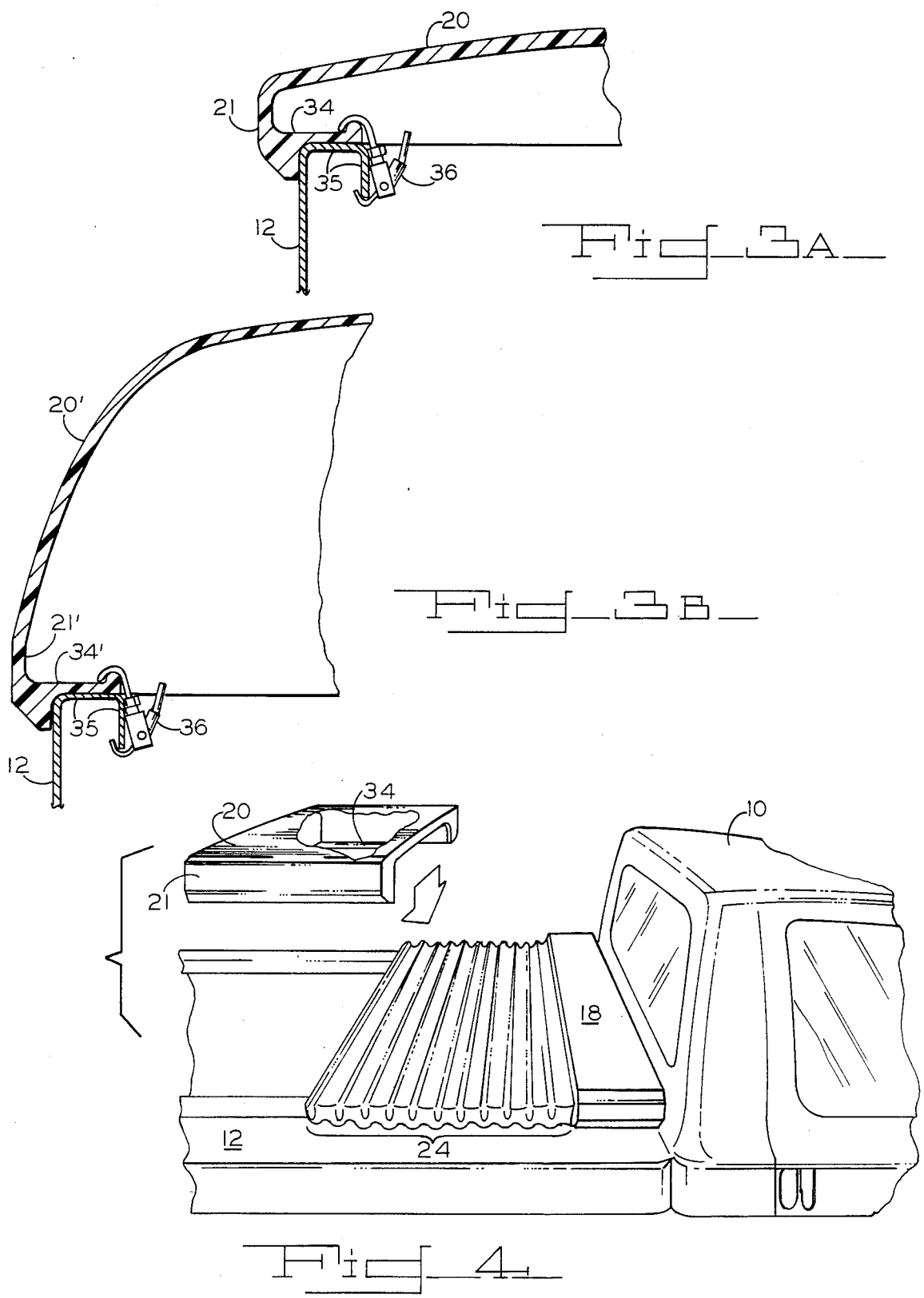

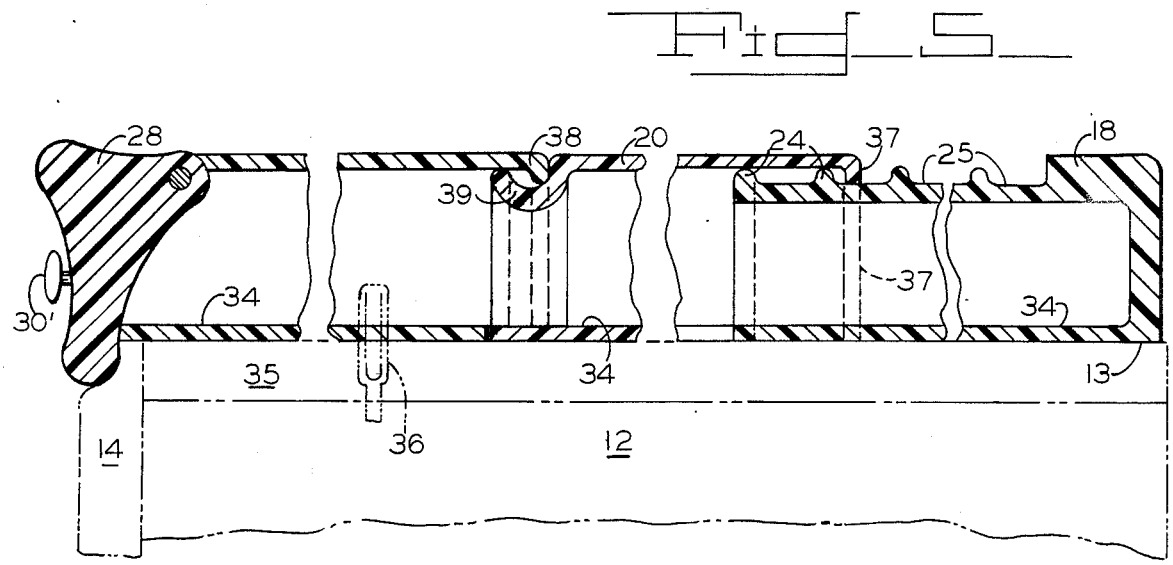
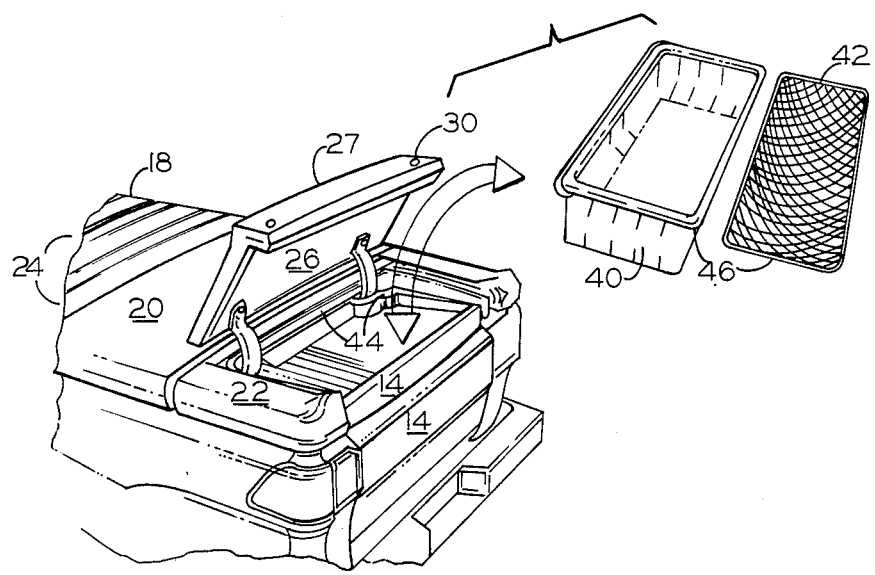

SECTIONALIZED ADJUSTABLE PICKUP TRUCK BOX COVER

FIELD OF THE INVENTION

This invention relates generally to detachable covers for pickup truck boxes and the like, and more particularly to a sectionalized box cover that may be emplaced and secured to the open top of a box, the sides of which bear definable flanges such as are found on the sidewalls of modern pickup trucks. The invention conceives of box covers that are essentially planar; but it is applicable, as well, to box caps having dome-like, semi-cylindrical, trapezoidal, rectangular box-form geometries.

BACKGROUND AND PRIOR ART

With the advent of the enclosed pickup truck bed, numerous apparatus and methods have been sought and suggested on how best to cover such a box in order to protect its contents. Further, with the modern trend toward a more extensive use of light utility vehicles, a concomitant need has arisen to afford versatile coverings that could also afford protection from the elements to human or animal occupants during a traveler's periods of rest or encampment. Some of the solutions are very practical and cover the spectrum from canvas tonneau covers to pickup bed-insertable camping or light housekeeping units. All of these apparatus, however, have or share at least one of several disadvantages. As the following discussion of the prior art dealing with pickup truck box covers will show, the most serious common disadvantage is the fixing of any cover by means that violate the integrity of the pickup box, i.e., place holes in the body of the vehicle. Another serious drawback to modern covers is that of excessive weight. Even the canvas type tonneau cover, when rolled and prepared for removal, weighs a considerable amount. As one familiar with the art may readily see, attachment of a canvas cover requires, in many cases, as many as 50 perforations of side-wall and tailgate ridges. A third, and often weighty disadvantage is that, in all of the prior art that the inventor was able to obtain through diligent searching of the patent files and literature, the removal of all covers leaves the owner either superfluous hardware or violations of the pickup body integrity with which he or she must contend. In northern climates, where salt is often used to remove ice and snow from the rods, such superfluous hardware or perforations in the body rapidly become points of corrosion. Two pertinent patents, U.S. Pat. Nos. 4,199,188 and 4,406,493 were issued to Albrecht in 1980 and 1983, respectively. The concept which is common to both of these inventions is the use of sectional, or modular, pickup bed covers that are emplaced transversely and sequentially on the pickup box, employing a set of side rails. The rails of both inventions are affixed to the sidewall upper margins (ridges) by screws or bolts. These inventions disclose an adjunct locking means which secures the tailgate against a portion of a modular unit (the rearmost unit) by locking the tailgate, with an ordinary clasp, to the rear margin of one or both of the sidewalls. The attachment of such a locking mechanism further violates the integrity of the box.

In a U.S. Pat. No. 4,615,557 issued to Robinson in 1986, there is disclosed a security cover for placement on the bed of a truck that includes a mounting frame on the top of the upper margins of the side walls, as well as transverse frame members for each of the two sections of the cover. As in U.S. Pat. Nos. 4,406,493 and 4,199,188, this invention bolts a frame to the sidewalls.

The patent issued to Anderson, No. 3,640,865, in 1972 hardly qualifies as a sectionalized or modular assembly in that the sections of this invention are telescoping sections which ride on a continuous railing. Thus, the entire unit is composed of a rather heavy assembly; and the rail portions are bolted to the sidewalls. An interesting aspect of this invention is that the rear telescopic section bears a hinged panel member that, when closed and secured, overlaps a closed tailgate. Anderson thus achieves his primary objective, that of mounting a cover that will adequately secure the pickup box contents.

SUMMARY OF THE INVENTION

The current problems, common to pickup truck box covers, are obviated by use of the instant invention. Three basic panel sections are employed: the first or front panel is a transverse box cover panel that has a transversely corrugated upper surface over its back or rear latter half-to-two thirds; the second is an intermediate or filler section comprising a transverse panel that, by design, overlaps the back or trailing portion of the front section; and the last section is a transverse rear panel which overlaps, by a groove interlock, either an intermediate section or a front section and has built within it means which will overlap and secure the standard pickup tailgate. Each discrete section, when placed in its proper position on the box of the typical pickup truck type, is clamped to the box by a series of clamps that are of the "C" clamp type, double-hooked shank type or overcenter draw-latch type. For this purpose, the clamp is secured first, to the internal flange of the pickup box side panels and then to an internal flange ridge located on the bottom side margin of each transverse panel. Thereafter, the clamp or latch is drawn taut and the section is thereby secured. The manner of emplacement is sequential, since no frame is used on which to mount or insert the sections of the invention independently. In the preferred method of assembly, the front section is placed on the box as far forward as possible, proximate the cab of the pickup truck. An overcenter draw-latch is fixed to each side (flange ridge) of this first transverse panel, whereby it is secured to the bed of the truck. An intermediate panel is then placed over the trailing portion of a forward section, interlocking while intermeshing with one of the transverse corrugations, to the extent predetermined by the length of the pickup bed and the number of intermediate sections required. The intermediate section(s) is (are) then secured sequentially after the fashion of the first panel. The rear or last panel is then placed over the trailing portion of an intermediate panel (or, if desirable or necessary, the front panel) by interlocking the rear groove of the intermediate (or front) panel with the overlapping front lip of the rear panel. A hingable rear lid portion, which is integral with the rear panel, is held open while the panel is secured. This opening of course, has a dual purpose: it provides the instant accessibility by which the rear section is secured/unsecured and, when closed and locked, it overlaps the top margin of the closed pickup truck tailgate, thus securing it in its normally closed position. In order to provide accessibility to light articles that are not secured to the pickup bed, the inventor has developed a drop-in bucket that will fit inside and under the hinged lid of the rear panel.

This option provides a separate and discreet box for containing items in the rear (and most accessible) portion of the now covered pickup box.

The foregoing description, as well as the detailed drawings and detailed description that follows, provide those of ordinary skill in this art the principles and techniques for practicing the invention. Having thus been taught, modifications and improvements may be had readily, consistent with the principles and techniques, but limited to the scope of the appended claims.

BRIEF DESCRIPTION OF THE DRAWINGS

Of the drawings:

FIG. 1A is an isometric illustration of the invention installed on a conventional pickup truck box cover;

FIG. 1B comprises an isometric illustration of the rear section, the locking portion of the rear panel and cross sectional illustrations of the wind-deflector locking portion of the rear section;

FIG. 2 is an isometric illustration of a variation of the invention installed on a conventional pickup truck box;

FIG. 3A and 3B are illustrations, in cross section, of two variations of the invention affixed to the top margin of a pickup truck box;

FIG. 4 is an isometric illustration showing the manner of installing an intermediate panel over the corrugated portion of a forward panel;

FIG. 5 is a stylized cross sectional illustration of the invention installed on the top margin of a pickup truck box; and FIG. 6 depicts an alternative rear section having provisions for a drop-in storage box.

DETAILED DESCRIPTION OF THE PREFERRED EMBODIMENT

FIGS. 1A, 1B and 2 relate, generally, to the invention in its preferred embodiment and in the two versions conceived by the inventor. In one version, that to be used most commonly, the essential elements of the preferred embodiment are enumerated with Arabic Numerals and, in the second less-commonly used version, correlatively enumerated with the same Arabic Numerals, but as primes (').

Referring now more particularly to FIG. 1A, there is depicted a standard pickup truck 10 bearing the more common version 16 of the preferred embodiment. In this illustration the four-section embodiment of the invention is shown, it being understood that the number of panel sections may range from two up to the desired number required to span the length of a particular box. For practical purposes, at least three panel sections are generally used and, for most uses in the United States, on American pick ups, four panel sections would appear to be the reasonable limit. The first (front) panel, or forward panel 18, is shown and placed on the pickup box 12 and located adjacent and proximate the pickup truck cab. The reader will note that the trailing portion (rear portion) of forward panel 18 is corrugated 24. The intermediate panel 20 is adapted to fit over portions of corrugations 24 and thus acquire the adjustability of the invention to pickup truck boxes of differing lengths. Each succeeding panel may interlock with the panel immediately in front of it (not shown in this figure). The final section of any ensemble will be a rear panel 22. Like the preceeding panels, panel 22 interlocks with the panel immediately preceeding it, here intermediate panel 20. In this version of the preferred embodiment, rear panel 22 is made with a liftable lid 26. Lid 26 serves a triple function in that it provides wind spoiler 27 geometry; access to the rear portion of the pickup truck box 12; and a locking means 30, by both internal lock mechanism and external geometry, for securing tailgate 14 in the closed postion. The purpose of spoiler 27 is, of course, to create a more laminar wind stream pattern over the back of the pickup truck 10 so as to reduce the drag caused by the airstream when the vehicle is moving at relatively high speeds. The physical lock mechanism 30, as will be readily recognized by those of ordinary skill, may be embodied after several fashions. In this version, the inventor has chosen to use simple lock-and-bolt mechanisms. The tailgate 14 is secured and accessed by the normal or conventional tailgate latching means. The entire sectionalized cover 16 is secured to pickup truck box 12 by means that will be detailed hereinafter.

The isometric and sectionalized illustrations of Figure 1B will serve to more clearly point out the details attendant on the aforementioned version of the rear panel. In the top illustration of FIG. 1B, rear panel 22 is shown without the liftable portion 26. In lieu thereof, the combination spoiler/tailgate lock 28 (hereinafter referred to as spoiler 28), is used to serve a dual purpose, but with less complication than the version embodying liftable lid 26. In this version, handle 30' serves both as a means for grasping and rotating the spoiler 28 about its hinge pins 32, as well as a means for locking the spoiler in the position shown in the third illustration of FIG. 1B. Referring more particularly to the third illustration of FIG. 1B, the reader will readily discern rear panel 22 resting atop pick-up truck box 12 with tailgate 14 in the closed position. Handle means 30' is employed to bring spoiler 28 into the closed position overlapping tailgate 14 and prominently placing surface 27' into the windstream. The fourth illustration of FIG. 1B shows spoiler 28 in the unlocked and raised position, thus freeing tailgate 14 and allowing access to the inside of the pickup box 12. After all of the elements of the preferred embodiment, in both versions, are clearly described, the inventor will recapitulate the installation process so that the reader might fully appreciate this innovative solution to the security, corrosion, and wind resistance problems that have constantly plagued pickup box-cover owners.

FIG. 2 illustrates, in isometric, the second version of the preferred embodiment 16'. Note that the transverse panels 18', 20', and 22' differ in the first version only in that the vertical dimension is increased so that the invention 16' actually comprises a cap for the box rather than a mere cover. It is in this version that ports (not shown) may be added to the right and left sides 21' of the heightened panels 20', 22'. Also in keeping with the more traditional mode of expression in pickup caps, the rear side 28' of rear panel 22' is depicted in glass. The reader will also be keenly aware of the analogy of the liftable portion 26 of panel 22 to the rear portion 28' of panel 22' in this (second) version. Note, as well, that handling and locking means 30' are used to secure tailgate 14 as in the earlier version.

The means for securing the entire ensemble 16, 16' to the top margin of box 12 is well known in the art. For ease of illustration, as depicted in FIGS. 3A and 3B, the inventor has chosen to use over center draw-latches 36 to secure the inner margin or flange ridge 34, 34' of typical panels 20, 20' to pickup truck box flanges 35. The reader will note that the side portions 21, 21' of the panels 20, 20' overlap the top margins of box 12. This design, coupled with the quick attachment capability of the over center draw-latch 36 allows the invention to be secured to a variety of pickup box designs ranging from the short bed foreign pickup to the long bed, wide bodied, American pickup truck. Figure 4 clearly illustrates how the transitional panel 20 and 20' (not shown) fits over the corrugated portion 24 of front panel 18. It should be noted that the transitional panel 20, 20', also known as an intermediate panel, does not have the flange ridges 34, 34' running to the extent found in the front or forward panels 18, 18' nor the rear panels 22, 22'. Because of the need to lap the front side of transition panel 20, 20' over corrugation section 24 of forward panel, 18, 18', it is necessary to place the securing flange ridge 34, 34' coextensive with left and right sides 21, 21', but only for the rearmost 50–60% of the panel's length (see FIG. 4).

In order to explain the techniques of installation, as well as the means of interconnecting the various panels, reference shall be had to FIGS. 5 and 6. FIG. 5 is a stylized, sectionalized illustration of the preferred body installed on pickup box 12 (in phantom), setting upon the top margin, also known as flange 35 of the box. First, forward panel 18 is rested atop the front portion of box 12 at approximately point 13; and, over center draw-latches 36 are installed on the left and right side of the panel (here, left side is depicted) in order to secure panel flange ridge 34 to the box flange 35. Once the forward panel 18 is secured, transitional or intermediate panel 20 is placed so that its leading or front side 37 engages corrugations 24 at the desired point by overlapping corrugations 24 and fitting into corrugation grooves 25. Thereafter, transition panel 20 is secured to box 12 by clamping it with over center draw-latch 36 fitted over flanges 34 and 35. If an additional transitional panel 20 is not desired, rear panel 22 may then be installed at the rear portion of transitional panel 20 by resting it on flange 35 and overlapping transitional panel 20 groove 39 by rear panel 22 overlap lip 38. If an additional intermediate or transitional panel 20 were to be employed, it would be installed in the same fashion as rear panel 22 with the only difference being that overlap lip 38 would be fitted into groove 39. Referring in the installation sequence to the terminal portion, i.e. installing rear panel 22, it should be realized that, with the illustrated version of FIG. 5, tailgate 14 may be in the open position. Thus, spoiler 28 may be either up or down. Once the rear section is installed and over center draw-latches 36 have secured it to box flange 35, spoiler 28 should be unlocked via locking/handling means 30' and the tailgate 14 placed in the closed position (as shown in FIG. 5). Spoiler 28 may be then brought down to the indicated postion and locked via locking means 30'.

The preferred embodiment having been thus described, the inventor wishes to dwell momentarily on the description of an adjunct to the invention which has been developed for convenience and ease of use. The need for securing the pick-up box notwithstanding, the cover must also have, in its first version, facility for easy access and storing of light tools and equipment. To this end, there is provided an insertable, easily removable basket means, equipment box 40 or net 42. The margins 46 of box 40 and net 42 are designed to fit inside of the space immediately under lid 26 and rest on box-support flanges 40 of the rear section 22. Whether the box 40 or net 42 insert is used depends on the particular needs of the user; in any case, the reader may note that installation of this version may be achieved with the pickup tailgate 14 in its up and closed position. The user has only to install rear panel 22 with lid 26 in the raised, unlocked position (as illustrated), interlocking transitional panel 20, and then install draw-latches 36 (not shown). Lid 26 spoiler 27 may be then brought down over pickup tailgate 14 and locked via locking means 30.

What is claimed:

1. A sectionalized, frameless and runner-free pickup truck box cover composed only of transverse panels comprising:
    a transverse first panel having a generally inverted "U" shape with a vertical front side, securable to the front of a pickup truck box and having transverse corrugations extending from side to side of said panel, said corrugations only in about the rear half to two-thirds of said first panel and adapted to receive a front side overlapping lip of another panel; and
    a transverse second panel securable to said box in the manner of said first panel and having a front overlapping lip interlockingly engagable with said first panel along one of said corrugations and further comprising a movable pickup truck tailgate securing means at its rear side.

2. A sectionalized pickup truck box cover composed only of a plurality of transverse panels comprising:
    a transverse front panel having a generally inverted "U" shape with a vertical front side, securable to the front of a pickup truck box and having about onehalf of its rearward top surface corrugated, said corrugations adapted to receive a front side overlapping lip of another panel;
    at least one transverse intermediate panel securable to said box in the manner of said front panel and having a front overlapping lip and a rear side transverse groove and adapted to accept and interlockingly engage panels placed to its front and rear by way of said overlapping lip fitting into one of said corrugations or grooves of a forward panel and said groove receiving the overlapping lip of a rearward panel; and
    a transverse rear panel securable toward the rear of said box in the manner of said front panel and having a front overlapping lip to interlockingly engage with another forward panel and further comprising at its rear side moveable pickup truck tailgate securing means.

3. The invention of claim 1 further comprising panel securement means composed of flanges near the bottom sides of all panels, said flanges adapted to be held in fixed registry with said box by clamps.

4. The invention of claim 2 further comprising panel securement means composed of flanges near the bottom sides of all panels, said flanges adapted to be held in fixed registry with said box by clamps.

5. The invention of claim 4 wherein movable tailgate securing means comprises a lockable lid which may be raised and lowered so that when lowered and locked a portion of the lid covers the top margin of the closed pickup truck tailgate.

6. The invention of claim 3 wherein movable tailgate securing means comprises a lockable lid which may be raised and lowered so that when lowered and locked a portion of said lid covers the top margin of said pickup tailgate in closed position.

7. The invention of claim 4 wherein movable tailgate securing means further comprises a pivotable wind stream spoiler that may be raised and lowered to be locked, whereby when lowered said pickup tailgate which is closed will be secured thereunder and said spoiler will be placed properly in said windstream.

8. The invention of claim 3 wherein movable tailgate securing means further comprises a pivotable wind stream spoiler that may be raised and lowered to be locked, whereby when lowered said pickup tailgate which is closed will be secured thereunder and said spoiler will be placed properly in said windstream.

9. The invention of claim 5 further comprising a drop-in box the margins of which will engage lid interior flange means, said flange means supportive of said lid when it is closed.

10. The invention of claim 6 further comprising a drop-in box the margins of which will engage lid interior flange means, said flange means supportive of said lid when it is closed.

11. A sectionalized, frameless and runner-free pickup truck box cover composed of a plurality of transverse panels that have a generally inverted "U" shaped transverse cross-section comprising;

a first rigid transverse panel for placement on and toward the front portion of a pickup truck box, said first panel having an essentially vertical front side, left and right sides with interior flanges therealong, said flanges securable to the truck bed sidewalls by clamp means, said first panel further bearing a transverse, partially corrugated top surface;

a second rigid transverse panel comprising a partial front side with an overlapping lid, an interior flange at the bottom of the left and right sides, said flange, securable to the truck bed sidewalls by clamp means, a rear side bearing a transverse groove, said partial front side lip adapted to engagably overlap a portion of said corrugated surface of said first panel;

a third rigid transverse panel for placement on and toward the back tailgate portion of said box and further comprising a front side bearing an over lapping, transverse lip adapted to interlock with said groove of said second panel, interior flanges as defined for said first and said second panels, and a backside the margin of which is moveable to cover and uncover the closed tailgate of said pickup truck; and clamp means for engaging at a plurality of discreet points the sidewall flanges of the pickup truck box and said left and right side flanges of said first, second and third panels.

12. The invention of claim 11 further comprising one or more of said second panels to tend additional length to said cover.

13. The invention of claim 11 further comprising a third panel that has a top lid therein and which accepts a drop-in basket, said basket supported by a lid interior flange, said flange further supporting said lid when it is closed.

* * * * *